May 21, 1957  G. R. COOK  2,793,050
PASSENGER SAFETY BAR FOR AUTOMOBILE WINDOWS
Filed Jan. 31, 1955  2 Sheets-Sheet 1

INVENTOR.
Gerald R. Cook
BY
Atty.

May 21, 1957 G. R. COOK 2,793,050
PASSENGER SAFETY BAR FOR AUTOMOBILE WINDOWS
Filed Jan. 31, 1955 2 Sheets-Sheet 2
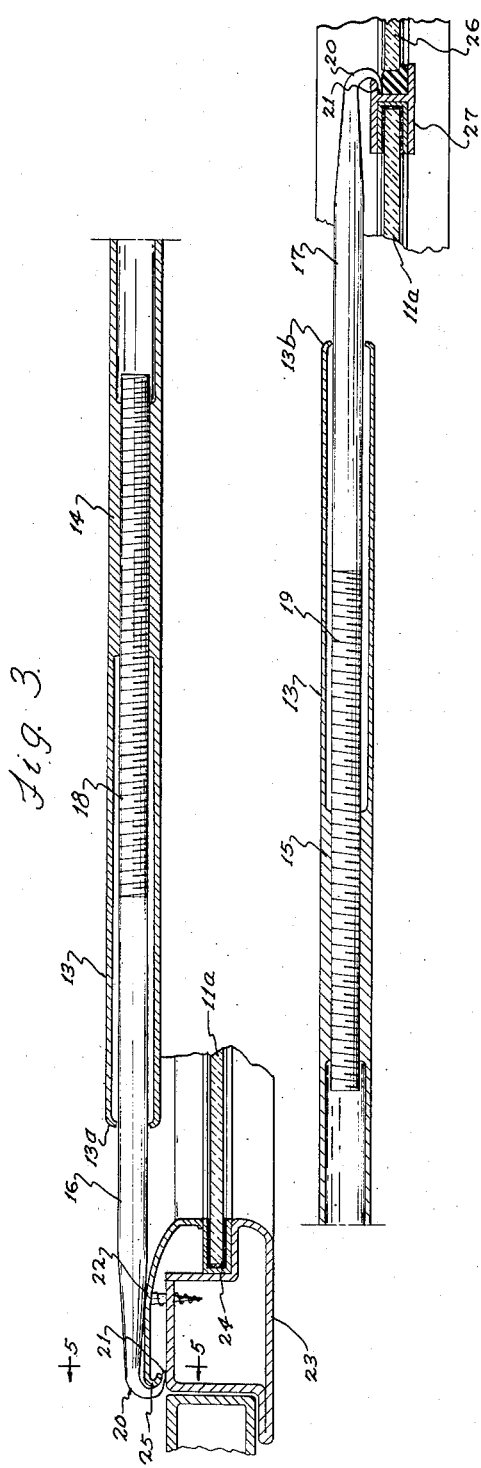
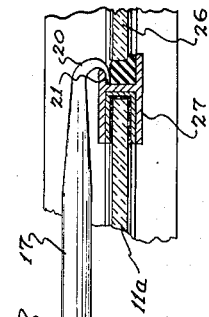
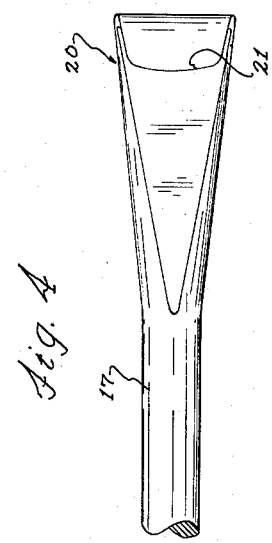
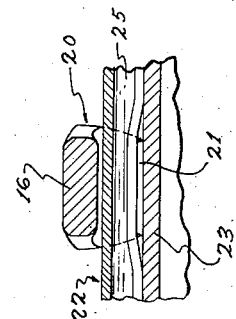
INVENTOR.
Gerald R. Cook
BY
Atty.

United States Patent Office 2,793,050
Patented May 21, 1957

2,793,050
PASSENGER SAFETY BAR FOR AUTOMOBILE WINDOWS

Gerald R. Cook, Lewiston, Idaho

Application January 31, 1955, Serial No. 485,277

1 Claim. (Cl. 280—150)

The present invention relates to improvements in a safety bar for automobile windows.

In traveling in automobiles with children or pets, there is the ever present danger of such children or pets falling out of the open windows. While this danger may be avoided by closing the windows, such action is undesirable, especially during the hot summer months since it cuts off a large part of the ventilation. A common practice has been to close the windows partially, so that the remaining open space is too small to permit passage of a body, but this gives rise to the danger of children hanging on the window glass, as is their nature, and breaking it, thus inflicting serious injury.

It is the principal purpose of my invention to provide a safety bar for automobile windows which may be quickly and easily attached to the vertical window facing strips within the automobile to prevent children and pets from falling out while the window is open.

A further purpose is to provide such a device which may be attached across the window opening inside the opening so that it will not interfere with the opening or closing of the window.

Other uses of the device are also contemplated. For instance, two bars may be placed across the window opening and a curtain fastened between them to provide a sun shade. The bar may be used as a hanger upon which to hang trousers or other clothes.

The nature and advantages of my invention will appear more fully from the following description and the accompanying drawings wherein a preferred form of the invention is shown. It should be understood, however, that the drawings and description are illustrative only, and are not intended to limit the invention except insofar as it is limited by the claim.

In the drawings:

Figure 3 is an enlarged plan sectional view of my invention showing it attached to an automobile window;

Figure 4 is an enlarged fragmentary view illustrating the hooked ends of the invention; and Figure 5 is an enlarged fragmentary sectional view taken on the line 5—5 of Figure 3.

Figure 1:
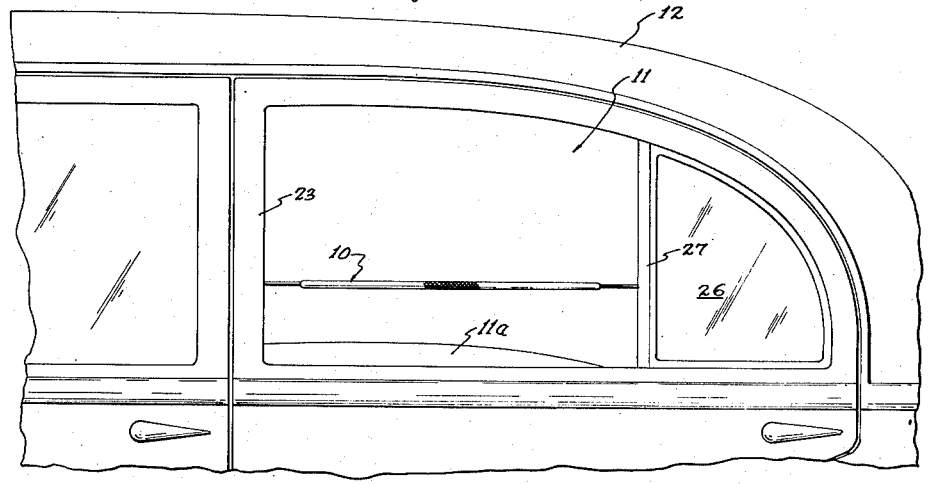
Figure 1 is a partial side view of an automobile showing rear side window fitted with my invention.
Figure 2:
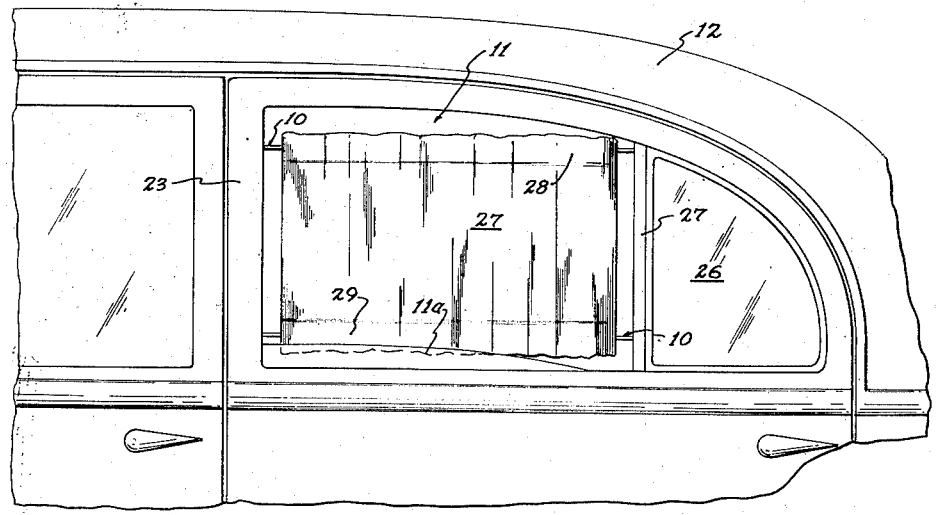
Figure 2 is a view similar to figure 1 except showing a pair of my improved safety bars supporting a curtain.

Referring now to the drawings and to Figures 1 and 2 in particular, my improved safety bar, generally indicated by the numeral 10, is shown as being secured across a rear side window opening 11 of an automobile 12.

My safety bar 10, best shown in Figure 3, comprises an elongated tubular member 13, open at each end, and which has two spaced apart internally threaded portions 14 and 15 therein. The internally threaded portions 14 and 15 are spaced inwardly from the ends of the tubular member 13, and are of somewhat smaller inside diameter than the remainder of the tubular member 13. The portion 14 has right hand threads therein, while the portion 15 has left hand threads therein. Two rods 16 and 17 extend into the tubular member 13 from the ends thereof. The rod 16 which extends into the tubular member 13 at the end nearest the right hand threaded portion 14, has formed at its inner end a right hand theraded portion 18. The portion 18 of the rod 16 threads into the threaded portion 14 of the member 13 to secure the rod 16 for endwise adjustment with the pipe section 13. The rod 17 which extends into the opposite end of the tubular member 13, has a left hand threaded portion 19 at its inner end which cooperates with the portion 15 to secure that rod 17 to the member 13 for endwise adjustment. The tubular member 13, except for the portions 14 and 15, is of substantially larger inside diameter than the rods 16 and 17 to provide greater strength against bending. The ends 13a and 13b of the member 13 are rolled inwardly as shown in Figure 3 to secure the rods 16 and 17 against transverse movement in the member 13.

Each of the rods 16 and 17 has at its outer end, a hook portion 20, shown in Figure 4. Each rod 16 and 17 is flattened at the end and bent back upon itself to form the hook 20, so that a wide and substantially sharp edge 21 is provided.

In the side window construction of present day automobiles, an inside facing strip 22 is provided around the window opening 11. This facing strip 22 covers the body structure generally indicated at 23, which supports the window guides 24. The facing strip 22 has a bent over lip 25 at the edge thereof remote from the window opening 11 which presses on the body structure 23 and clamps the window guides 24 in place, as shown in Figure 3.

To install the bar 10, the rods 16 and 17 are screwed out of the pipe section 13 until the bar 10 is long enough to extend completely across the window opening and the facing strips 22 at each side. The rods 16 and 17 are then turned so that the hooks 20 are directed against the body structure 23 at each side of the window opening, and the edges 21 of the hooks 20 are positioned adjacent the bent over lips 25 of the strips 22. Now by grasping the pipe section 13 and rotating it in such a direction that the rods 16 and 17 are drawn toward each other, the safety bar 10 may be secured. As the rods 16 and 17 are drawn together, the edges 21 of the hooks 20 are forced under the lips 25 of the strips 22. As the rods 16 and 17 are drawn up tight, the hooks 20 curl the adjacent portions of the lips 25 under somewhat, as shown in Figure 3, and form seats to prevent the bar 10 from slipping down when pressure is applied thereto.

The safety bar is now installed and considerable pressure may be applied to it without dislodging it from its position. Since the safety bar 10 is attached to the facing strips 22 inside the window opening 11, the window glass 11a, which travels up and down in the guides 24, is not affected and may be turned up or down at will.

Where the window 11 includes a quarter or wing section 26, the hook 20 is secured to the edge of the dividing channel member 27 which separates the quarter section 26. This type of construction is shown at the right hand end of the safety bar 10 in Figure 3.

The safety bar may be removed when desired by merely grasping the pipe section 13 and rotating it in such a direction that the rods 16 and 17 are forced outwardly.

It will be appreciated that my improved safety bar 10 may be used for many other purposes also. For instance, two of the bars 10 may be used to support a curtain as shown in Figure 2. For this application, a piece of fabric 27, folded over and sewed at the top and bottom to form top and bottom hems 28 and 29 is provided. A safety bar 10 is inserted in each of the hems 28 and 29 in the manner of a curtain rod. The safety bars 10 are then attached to the facing strips 22 near the top and bottom of the window opening 11 as shown in Figure 2, with the fabric 27 supported therebetween. When it is desired to allow light to enter through the window, the fabric can be pushed to one side of the bars 10, and then drawn back over the window at will.

The safety bar 10 also provides a handy clothing rod over which clothing may be draped, or on which clothes hangers may be suspended.

It is believed that the nature and advantages of my invention appear clearly from the foregoing description.

Having thus described my invention, I claim:

A means for providing cross bars in a car window opening which leaves the window glass free to be opened or closed, comprising the combination with the facing strip surrounding the window opening of two elongated threaded rods having flattened end hooks inserted beneath the outer edge of the facing strip and extending toward each other, a tubular member receiving the rods at its opposite ends, said tubular member having threaded portions therein engaging said rods and operable to draw them together when the tubular member is rotated, whereby to engage said hooks with said facing strip, said tubular member being substantially larger in inside diameter than said rods and having its ends reduced in diameter to support said rods against movement perpendicular to the axis of said member.

References Cited in the file of this patent

UNITED STATES PATENTS

| | | |
|---|---|---|
| 736,242 | Gable | Aug. 11, 1903 |
| 1,596,795 | Blakeney | Aug. 17, 1926 |
| 1,803,883 | Weaver | May 5, 1931 |
| 2,151,223 | Nayman | Mar. 21, 1939 |
| 2,456,157 | Tadd | Dec. 14, 1948 |
| 2,459,884 | Kopf | Jan. 25, 1949 |
| 2,676,816 | Kern | Apr. 27, 1954 |
| 2,755,525 | Minot | July 24, 1956 |

FOREIGN PATENTS

| | | |
|---|---|---|
| 244,653 | Italy | Feb. 5, 1926 |